United States Patent [19]

Selzer et al.

[11] Patent Number: 4,919,399
[45] Date of Patent: Apr. 24, 1990

[54] SUSPENSION BRAKE TORQUE REACTION LEAF

[75] Inventors: Robert J. Selzer; Noel E. Leitzman, both of Fort Wayne, Ind.

[73] Assignee: Navistar International Transportation Corp., Chicago, Ill.

[21] Appl. No.: 335,629

[22] Filed: Apr. 10, 1989

[51] Int. Cl.$^5$ .......................................... B60G 11/02
[52] U.S. Cl. ........................................ 267/31; 267/41; 267/45; 267/48; 267/52; 280/712; 280/718
[58] Field of Search ................... 267/31, 32, 52, 36.1, 267/44, 47, 45, 48, 46, 158, 41, 273, 283; 280/703, 712, 718, 719, 720

[56] References Cited

U.S. PATENT DOCUMENTS

| | | | |
|---|---|---|---|
| 1,557,237 | 10/1925 | Bobo | 267/45 |
| 1,733,365 | 10/1929 | Beaumont et al. | 267/45 |
| 1,747,727 | 2/1930 | Monteith | 267/48 |
| 2,188,689 | 1/1940 | Marco | 267/45 |
| 2,413,291 | 12/1946 | Chapin | 267/45 X |
| 2,791,419 | 5/1957 | Whalen | 267/45 |
| 2,815,945 | 12/1957 | Green | 267/45 |
| 2,861,797 | 11/1958 | Norrie | 267/44 X |
| 2,861,798 | 11/1958 | Lenet et al. | 267/45 |
| 2,874,956 | 2/1959 | LaBelle | 267/31 X |
| 2,951,696 | 9/1960 | Lenet | 267/48 X |
| 3,038,715 | 6/1962 | Davidson et al. | 267/45 X |
| 3,039,759 | 6/1962 | Paller | 267/48 |
| 3,062,526 | 11/1962 | Roehrig | 267/48 |
| 3,281,139 | 10/1966 | Faherty, Sr. | 267/47 |
| 3,288,456 | 11/1966 | Paioletti et al. | 267/45 |
| 3,312,459 | 4/1967 | Pence | 267/45 |
| 3,541,605 | 11/1970 | Mohl | 267/47 |
| 3,578,355 | 5/1971 | Oeder | 267/52 X |
| 3,580,347 | 5/1971 | McGee | 267/40 X |
| 3,707,297 | 12/1972 | Perreault et al. | 267/48 X |
| 3,730,549 | 5/1973 | Turner, Jr. | 267/31 X |
| 3,730,550 | 5/1973 | Thaxton | 267/31 X |
| 3,933,367 | 1/1976 | Tamas | 267/262 |
| 4,033,608 | 7/1977 | Sweet et al. | 267/31 X |
| 4,282,945 | 8/1981 | Bessey | 267/52 X |
| 4,494,772 | 1/1985 | Smith | 267/31 X |
| 4,580,809 | 4/1986 | Leaf | 280/712 |
| 4,643,447 | 2/1987 | Rogers | 267/31 X |

FOREIGN PATENT DOCUMENTS 1505412  8/1969  Fed. Rep. of Germany ...... 280/712

Primary Examiner—Douglas C. Butler
Attorney, Agent, or Firm—F. David AuBuchon; Dennis K. Sullivan

[57] ABSTRACT

A vehicle suspension system includes an elongate dual leaf spring assembly mounted at each end thereof to a vehicle frame member and which is adapted to be engaged over an axle of the vehicle at an approximate midpoint along the length thereof. A brake torque reaction beam comprising a thick, planar half leaf spring member has one end thereof engaged between the leaf spring assembly and the axle. The other end of the reaction beam member extends rearwardly away from the midpoint of the leaf spring assembly a predetermined distance which is slightly less than to greater than the distance the leaf spring assembly extends rearwardly. In a preferred embodiment, an air bag is suspended from the vehicle frame member and interposed between the frame member and the leaf spring assembly at the approximate midpoint thereof and is engaged to the leaf spring assembly.

12 Claims, 2 Drawing Sheets

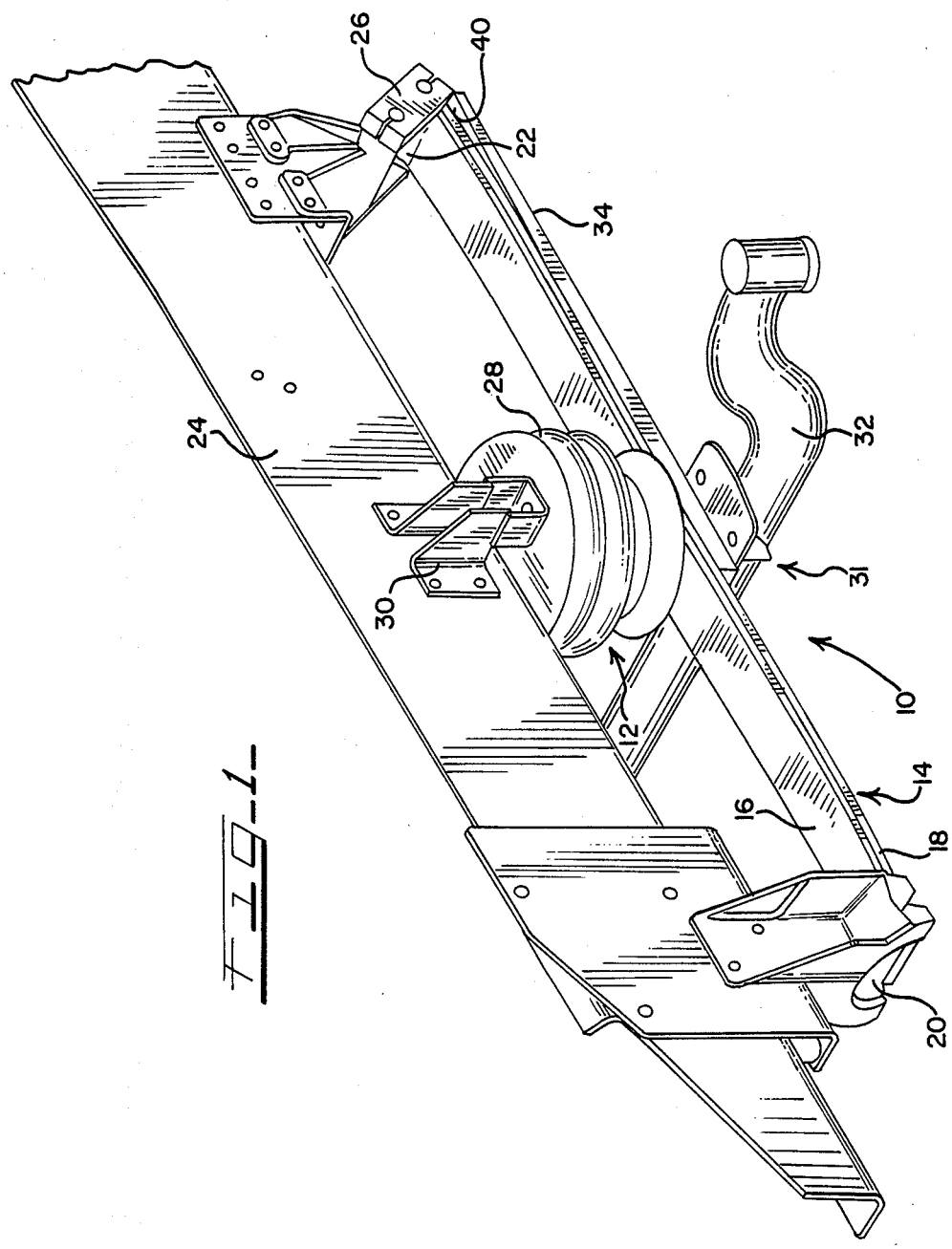

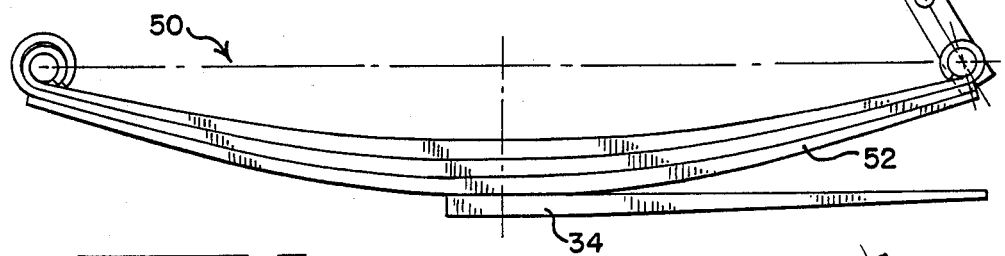
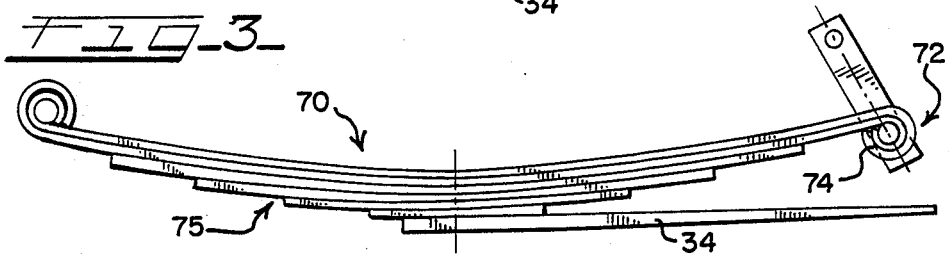
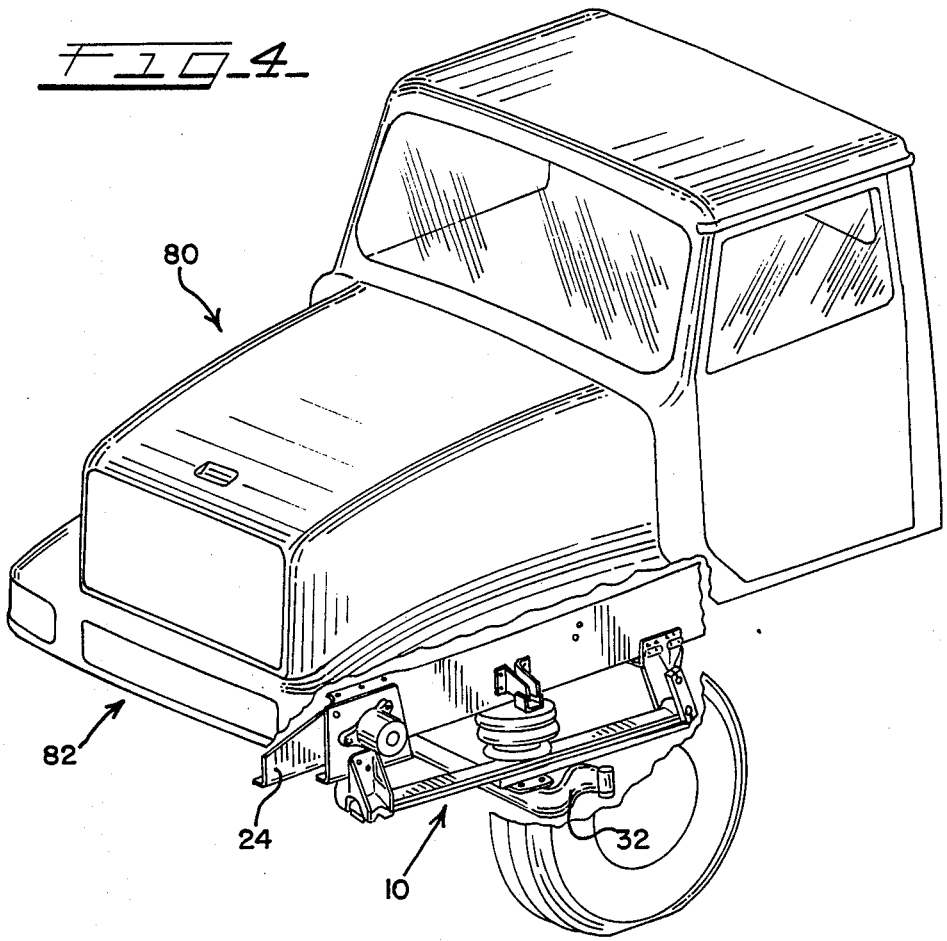

SUSPENSION BRAKE TORQUE REACTION LEAF

BACKGROUND OF THE INVENTION

The present invention relates to a reaction beam member or leaf which is used in combination with a suspension system of a vehicle including at least one leaf spring to aid in resisting braking torque about an axle with which the reaction beam member is utilized.

THE PRIOR ART

Heretofore various embodiments of helper and/or overload springs have been proposed for use with conventional leaf spring assemblies, to provide a vehicle which will carry loads which are heavier than those originally intended for the vehicle to carry. Examples of such assisted suspension systems are disclosed in the following U.S. Pat. Nos.:

| U.S. Pat. No. | Patentee |
| --- | --- |
| 2,861,798 | Lenet et al. |
| 3,281,139 | Faherty, Sr. |
| 3,541,605 | Mohl |

The Lenet et al. U.S. Pat. No. 2,861,798 discloses an auxiliary leaf spring of relatively simple construction which may be applied to a standard vehicle without modification of the standard spring structure and which functions only during an overload condition, with the auxiliary spring being dissociated from the standard spring during normal load conditions. The spring here comprises a strip of steel which is substantially equal in length with the length of the spring with which it is used and has a width slightly wider than the width of the spring. The auxiliary spring, in an unstressed condition, is generally straight when viewed in a side elevation but has ends that are curved slightly upwardly with each end being provided with a pad formed of a resilient rubber or like material. The auxiliary spring serves under overload conditions to engage and support the end portions of the main spring against the pads of the auxiliary spring. The pads are mounted in a manner where they can be readily replaced when worn.

The Faherty Sr. U.S. Pat. No. 3,281,139 discloses a spring nest comprising a plurality of superimposed spring elements extending from a common connection, generally in the form of an elliptical or cantilevered type assembly. The spring structure includes a base member having slightly spaced apart leaves extending outwardly therefrom, with each of the leaves being integral with the base member. The leaves extend substantially symmetrically from opposite ends of the base member with the leaves becoming progressively shorter in length than the main leaf, with the main leaf being the top leaf of the assembly. The main leaf is arched, and each of the short leaves thereunder has an additional arch of curvature whereby the outer end portions of each of the additional leaves substantially engage the longer leaf thereabove. With this arrangement, the structure is such that the eyes and base member may be connected to a support in a manner such that an increase in the load will tend to straighten the main leaf and, through the engagement of the progressively shorter leaf members thereunder, the pressure imposed by each of the leaves is increased as they are also straightened to provide additional resistance to support the load, with each successive leaf resting upon the end of the leaf therebeneath.

The Mohl U.S. Pat. No. 3,541,605 discloses a progressive leaf spring assembly including a soft, upper spring member which is in the form of a packet of relatively thin spring leaves and a lower spring in the form of a single thick leaf. The upper and lower spring are clamped together at a central point thereof and in their non-loaded state diverge from each other in a direction away from the zone of clamping. It is stated that the product of the modulus of elasticity of the thick lower leaf spring and the moment of inertia of same in the cross section at the clamping point is at least four times as high as the sum of the corresponding products for all the spring leaves of the upper spring. The lower leaf spring serves here as an auxilliary spring which is forced into action to support and strengthen the main spring under extreme load.

As will be described in greater detail hereinafter, the suspension brake torque reaction leaf of the present invention is, contrary to the teachings set forth above, not provided for aid in vertical suspension, but rather is provided for use with a regular leaf spring suspension system to aid in resisting braking torque about an axle and to prevent excessive stress from building up in the components of the suspension system during braking. As will be defined further hereinafter, the brake torque reaction leaf or beam member may be utilized with multi-leaf springs, taper leaf springs, and with a dual leaf spring/air spring suspension system.

SUMMARY OF THE INVENTION

According to the invention, there is provided a vehicle suspension system including an elongate dual leaf spring assembly mounted at each end thereof to a vehicle frame member and which is adapted to be engaged over an axle of the vehicle at an approximate midpoint along the length thereof and further including a brake torque reaction beam comprising a thick, planar half leaf spring member having one end engaged between the leaf spring assembly and the axle. The other end of the reaction beam member extends rearwardly away from the midpoint of the leaf spring assembly a predetermined distance which is slightly less than to greater than the distance the leaf spring assembly extends rearwardly. The brake torque reaction leaf or beam member may be used in combination with multileaf springs or tapered leaf springs. In a preferred embodiment, an air bag is suspended from the vehicle frame member and interposed between the frame member and the leaf spring assembly at the approximate midpoint thereof and is engaged to the leaf spring assembly.

BRIEF DESCRIPTION OF THE DRAWINGS

FIG. 1 is a perspective view of the brake torque reaction leaf of the present invention shown in combination with a combination suspension system including a dual leaf spring and air spring combination.

FIG. 2 is a perspective side view of the brake torque reaction leaf used in combination with a tapered leaf spring suspension system.

FIG. 3 is a side view of the brake torque reaction leaf of the present invention used in combination with a multi-leaf spring suspension system.

FIG. 4 is a perspective view of the dual leaf spring and air spring combination suspension system of FIG. 1 including the brake torque reaction leaf of the present invention, shown mounted to the chassis of a vehicle.

DESCRIPTION OF THE PREFERRED EMBODIMENTS

Referring to the drawings in greater detail, there is illustrated in FIG. 1 a combination suspension system 10 which includes an air spring 12 in combination with a dual leaf spring assembly 14. The dual leaf spring assembly 14 includes two leaves 16 and 18 which are equal in length and preferably, made of steel. The dual leaf spring assembly 14 is mounted at its longitudinal ends 20 and 22 so as to depend from a frame member 24 of a vehicle (FIG. 4) in known manner, with the end 20, which will be considered the forward end 20, of the spring assembly 14 being pivotally secured to the frame member 24 in known manner and the end 22, which will be considered the rearward end 22, of the spring assembly 14 being secured to the frame member 24 by means of a swinging shackle 26, also in known manner.

The air spring 12 of the system 10 comprises an air bag 28 which depends from the frame member 24 via a fixed bracket 30. The air bag 28, as shown, is positioned by the fixed bracket 30 to seat between the frame 24 and the dual leaf spring assembly 14 at an approximately center location along the length of the spring assembly 14, and directly over a point of attachment, at 31, of the assembly 14 to an axle 32 to the vehicle (FIG. 4). The air bag 28 is fluidly connected to a conventional pneumatic control system (not shown) which will maintain the frame member 24 of the vehicle at a constant height relative to the axle 32 whether the vehicle is fully loaded or empty, by adding or exhausting air from the air bag 28.

Located beneath the spring assembly 14 and extending rearwardly from the point of attachment at 31 of leaf spring assembly 14 and the axle 32 is a brake torque reaction beam member or leaf 34. As shown, the reaction leaf 34 is substantially thicker than the leaves 16 and 18 and thus forms a beam member 34 which is not as easily deflected as are the leaves 16 and 18 of the spring assembly 14. The reaction leaf or beam member 34 extends rearwardly from its point of forward engagement at 31 a distance which fully engages the spring leaf but provides clearance from engagement with the rear swinging shackle 26 of the spring assembly 14.

The brake torque reaction leaf or beam member 34 provides a slight nominal increase in the vertical spring rate of the combination spring assembly 10, but provides a significant increase in brake torque resistance of the suspension assembly 10 about the axle 32.

The reaction leaf or beam member 34 is a necessary element of the suspension assembly 10, inasmuch as the spring leaves 16 and 18, which are made of steel, are of a low rate design and will not endure the application of torque generated by braking. The reaction leaf or beam member 34 is provided to support the steel spring leaves 16 and 18 and prevent overstressing thereof during braking in a manner which provides a gradual increase in brake torque resistance.

In this respect, as braking takes place, the spring leaves 16 and 18 are deflected downwardly and rearwardly of the point of attachment at 31 to the axle 32 in a gradual manner, with the lower leaf 18 o the spring assembly 14 resting along a gradually increasing length of an upper surface 40 of the reaction leaf or beam member 34. Such gradually increasing contact between the leaf spring assembly 14 and the reaction leaf 34 provides a gradual increase in the torque resisting effect of the reaction leaf or beam member 34 and resists the build up of momentum in the chassis (FIG. 4) of the vehicle during braking. By resisting such build up of momentum in the chassis during braking, such as when the combination suspension assembly is mounted on a front axle 32, the commonly experienced chassis "nosedive" during braking is significantly reduced, if not altogether eliminated.

The amount of resistance to brake torque (as well as the amount of load sharing, if any) may be controlled by first determining the deflection characteristics of the combination suspension assembly 10 and then providing an appropriate gap or clearance between the main spring leaves 16 and 18 and the reaction leaf or beam member 34.

The reaction leaf or beam member 34 may also, alternatively, be utilized with existing suspension systems, such as the taper leaf spring system 50 shown in FIG. 2 and the multi-leaf spring system 70 shown in FIG. 3.

Turning now to FIG. 2, when the reaction leaf or beam member 34 is to be used with the taper leaf spring suspension system 50 shown, the reaction leaf 34 may be tapered to reflect the tapered pattern of the taper leaf springs 52 of the system 50 with which the reaction leaf 34 is to be used.

Here, the configuration of the reaction leaf or beam member 34 and the spacing between the suspension system 50 and the reaction leaf 34 may be varied to vary the amount of resistance to brake torque provided by the reaction leaf 34.

As shown in FIG. 3, the reaction leaf or beam member 34 also may be used with a multi-leaf spring suspension system 70. Here it will be noted that a rear connection 72 of the multi-leaf spring system 70 has been slightly modified from the norm for use with the reaction leaf or beam member 34. In this respect, the eye connection 74, formed by the ends of the longest tiered leaves 75, of the suspension system 70 has been reversed in direction, i.e., has been directed downwardly rather than upwardly as is typical, to provide an adequate spacing between spring system 70 and the reaction leaf or beam member 34 to control the amount of load sharing during normal operation of the vehicle, as well as during braking of the vehicle.

FIG. 4 illustrates the mounting of the combination suspension system 10 of FIG. 1 to the frame member 24 of a vehicle 80 and over a front axle 32 of the vehicle 80.

Nosedive of a chassis 82 of the vehicle 80 is virtually eliminated by the suspension system 10 inasmuch as the nosedive is compensated for the provision of the reaction leaf or beam member 34 which keeps the leaf springs 16 and 18 suspended thereabove from being deflected severely rearwardly downwardly during braking by the brake torque occurring about the axle 32. Further, the air bag 28 assists in avoiding nosedive of the chassis 82 by maintaining the height of the frame member 24 constant relative to the axle 32, regardless of the load placed on the vehicle 80.

It will be understood that the spacing between the reaction leaf or beam member 34 and the tiered leaves 75 of the multi-leaf suspension system 70, as well as the tiered leaves 52 of the taper leaf suspension system 50, will vary according to vehicle load, since these systems are not provided with an air bag 28 to maintain the distance between the frame member 24 of the vehicle and the axle 32 constant. Thus, as the load is increased, the gap or spacing will decrease. This minimized spacing is useful since the increase in load will cause a corresponding increase in brake torque to be resisted, and the minimization of the spacing will work to accommodate for the increased brake torque by effectively increasing the resistive effect of the reaction leaf or beam member 34 against suspension system 50 or 70.

As has been described above, the reaction leaf or beam member 34, as well as the combination suspension system 10 of the present invention provide a number of advantages, some of which have been described above and others of which are inherent in the invention. Further, modifications may be made to the reaction leaf or beam member 34 and to the combination suspension system 10 of the invention without departing from the teachings of the present invention. Accordingly, the invention is only to be limited as necessitated by the accompanying claims.

We claim:

1. In combination with a leaf spring suspension system including leaf spring means comprising at least one leaf having its ends joined to a vehicle frame and to an axle of the vehicle at an approximate center point thereof so as to extend forwardly and rearwardly of said axle approximately equally, a brake torque reaction member for preventing excessive stress from building up during braking comprising a planar elongate member anchored at one end thereof between said axle and said centerpoint of said spring assembly and extending rearwardly therefrom in cantilever fashion to an unsupported end, said unsupported end being disposed to engage said leaf spring means only upon imposition of braking torque on said axle, wherein said brake torque reaction member does not aid in vertical suspension.

2. The combination of claim 1 wherein said leaf spring means comprises a taper leaf spring assembly.

3. The combination of claim 1 wherein said leaf spring means comprises a multi-leaf spring assembly.

4. The combination of claim 3 wherein said multi-leaf spring assembly is mounted at a rear end thereto to said vehicle frame member by a shackle.

5. The combination of claim 4 wherein said multi-leaf spring assembly includes an eye formation at a rear end of said spring which engages over a pin mounted at a lower end of said shackle to provide a pivotable engagement of the spring assembly to the vehicle frame.

6. The combination of claim 5 wherein said eye formation of said spring assembly comprises a downwardly circled portion of an uppermost leaf of said spring assembly.

7. The invention in accordance with claim 1 wherein said unsupported end is located a predetermined distance approximately equal to the distance said spring assembly extends rearwardly.

8. A combination air-spring leaf-spring suspension system for a vehicle having a frame member and an axle including:

leaf spring means comprising an elongate dual leaf spring assembly operatively attached to said axle of the vehicle, said leaf spring assembly extending forwardly and rearwardly of said axle an approximately equal distance, and means mounting each end of said leaf spring assembly to said vehicle frame member;

air spring means suspended from said vehicle frame member and interposed between said frame member and said leaf spring assembly adjacent said axle and engaged with said leaf spring assembly;

a brake torque reaction beam comprising a planar half leaf spring member having one end engaged between said leaf spring assembly and said axle and the other end extending rearwardly away therefrom to a free end, said free end of said brake torque reaction beam having a normal operating position disengaged from said leaf spring means and, upon a vehicle braking torque being imposed on said axle, a braking position engaging said leaf spring means, wherein said brake torque reaction member does not aid in vertical suspension.

9. The combination of claim 8 wherein said leaf spring assembly is made of steel.

10. The combination of claim 8 wherein said air spring means comprise an air bag.

11. The combination of claim 8 wherein said ends of said spring assembly are pivotally fixed to said frame member of said vehicle.

12. The invention in accordance with claim 8 wherein said mounting means of the rear end of said leaf spring assembly to said vehicle frame member comprises a shackle.

* * * * *